United States Patent
James et al.

(10) Patent No.: US 10,328,351 B2
(45) Date of Patent: Jun. 25, 2019

(54) VIDEOGAME CONTROLLER ADAPTER

(71) Applicants: Praveen James, Grand Ledge, MI (US); Naveen James, Coimbatore (IN)

(72) Inventors: Praveen James, Grand Ledge, MI (US); Naveen James, Coimbatore (IN)

( * ) Notice: Subject to any disclaimer, the term of this patent is extended or adjusted under 35 U.S.C. 154(b) by 5 days.

(21) Appl. No.: 15/857,105

(22) Filed: Dec. 28, 2017

(65) Prior Publication Data
US 2018/0318721 A1    Nov. 8, 2018

Related U.S. Application Data

(60) Provisional application No. 62/501,193, filed on May 4, 2017.

(51) Int. Cl.
*A63F 13/98*    (2014.01)
*A63F 13/24*    (2014.01)

(52) U.S. Cl.
CPC .............. *A63F 13/98* (2014.09); *A63F 13/24* (2014.09); *A63F 2300/1043* (2013.01)

(58) Field of Classification Search
CPC ... A63F 13/98; A63F 13/24; A63F 2300/1043
See application file for complete search history.

(56) References Cited

U.S. PATENT DOCUMENTS

| | | | |
|---|---|---|---|
| 6,614,420 B1 * | 9/2003 | Han | A63F 13/06 345/156 |
| 6,641,479 B1 * | 11/2003 | Ogata | A63F 13/06 463/37 |
| 6,664,946 B1 * | 12/2003 | Stipes | G06F 3/0346 345/157 |
| 6,811,491 B1 * | 11/2004 | Levenberg | A63F 13/02 273/148 B |
| 7,833,097 B1 * | 11/2010 | Maddox | A63F 13/23 455/556.1 |
| 8,105,169 B2 * | 1/2012 | Ogasawara | G06F 1/1624 463/46 |

(Continued)

OTHER PUBLICATIONS

Amazon.com search for "microsoft controller," downloaded Sep. 17, 2018.*

(Continued)

*Primary Examiner* — David L Lewis
*Assistant Examiner* — Matthew D Hoel

(57) ABSTRACT

A videogame controller adapter allows a user to modify how a videogame controller is grasped to increase comfort, increase reaction time, and reduce the excretion of moisture between the user's hand and the videogame controller. The videogame controller adapter includes a first controller grip mount and a first digit support. The first controller grip mount affixes to a handgrip of the videogame controller to directly support the videogame controller. The first digit support is placed between the user's digits and grasped by the user to support the present invention and the videogame controller. The first digit support is adjacently connected to the first controller grip mount. The first digit support is oriented away from the videogame controller in order to allow the user to grasp the videogame controller to allow for better positioning of the user's fingers over the buttons of the videogame controller, potentially increasing the user's reaction time.

9 Claims, 16 Drawing Sheets

(56) References Cited

U.S. PATENT DOCUMENTS

| | | | | |
|---|---|---|---|---|
| 8,313,379 B2* | 11/2012 | Ikeda | ............ | A63F 13/24 |
| | | | | 345/158 |
| 8,493,326 B2* | 7/2013 | Martinez | ............ | A63F 13/06 |
| | | | | 345/168 |
| 8,550,915 B2* | 10/2013 | Ashida | ............ | A63F 13/02 |
| | | | | 345/156 |
| 8,690,675 B2* | 4/2014 | Ito | ............ | A63F 13/42 |
| | | | | 463/37 |
| 8,858,335 B2* | 10/2014 | Helmes | ............ | G06F 1/1632 |
| | | | | 463/37 |
| 9,789,395 B2* | 10/2017 | Igarashi | ............ | G06F 3/017 |
| 2005/0269769 A1* | 12/2005 | Naghi | ............ | A63F 13/06 |
| | | | | 273/148 B |
| 2017/0354895 A1* | 12/2017 | Dornbusch | ............ | A63F 13/24 |

OTHER PUBLICATIONS

Amazon.com search for "sony controller," downloaded Sep. 17, 2018.*

Amazon.com search for "nintendo controller," downloaded Sep. 17, 2018.*

* cited by examiner

VIDEOGAME CONTROLLER ADAPTER

The current application claims a priority to the U.S. Provisional Patent application Ser. No. 62/501,193 filed on May 4, 2017.

FIELD OF THE INVENTION

The present invention relates generally to an apparatus for video game controllers. More specifically, the present invention is an apparatus for video game controllers that allows the user to have better handling of the controller, faster reaction time, and prevent moisture accumulation on the user's palms.

BACKGROUND OF THE INVENTION

Since the inception of videogames, the popularity of videogames has increased over the years. The user manipulates actions within the videogame through an input device, such as a controller. Advancements in the design of the controller form have been made to make the controller more comfortable for the user to grasp the controller and position buttons of the controller to be more accessible. A comfortable and well-made controller can increase enjoyment in experiencing the gameplay of the videogame by increasing reaction time to press buttons in relation to visual cues and reduce cramping in the user's hand from extended gameplay. With the release for each videogaming console, new controllers are created, specifically for that videogaming console, to further maximize the gamers ability when playing. Even with input from previous iterations of controllers, there are still some areas users would appreciate improvements that are not addressed.

The present invention is a videogame controller adapter. The present invention is an apparatus that attaches onto videogame controllers, which allows the user better handling of the controller, faster reaction time, and will help create less moisture from the palms. The present invention modifies how the user grasps the controller to optimize finger positions over the buttons of the videogame controller, to reduce skin contact with the videogame controller, and to provide an ergonomic grip onto the videogame controller.

DETAIL DESCRIPTIONS OF THE INVENTION

All illustrations of the drawings are for the purpose of describing selected versions of the present invention and are not intended to limit the scope of the present invention.

The present invention is a videogame controller adapter. The present invention is attached to an existing videogame controller in order to allow the user to grasp the videogame controller ergonomically to optimize finger positioning over buttons of the videogame controller, to increase the user's reaction time to engage each button. Additionally, the present invention reduces skin contact with the videogame controller to reduce the excretion of moisture between the user's hand and the videogame controller.

Figure 1:
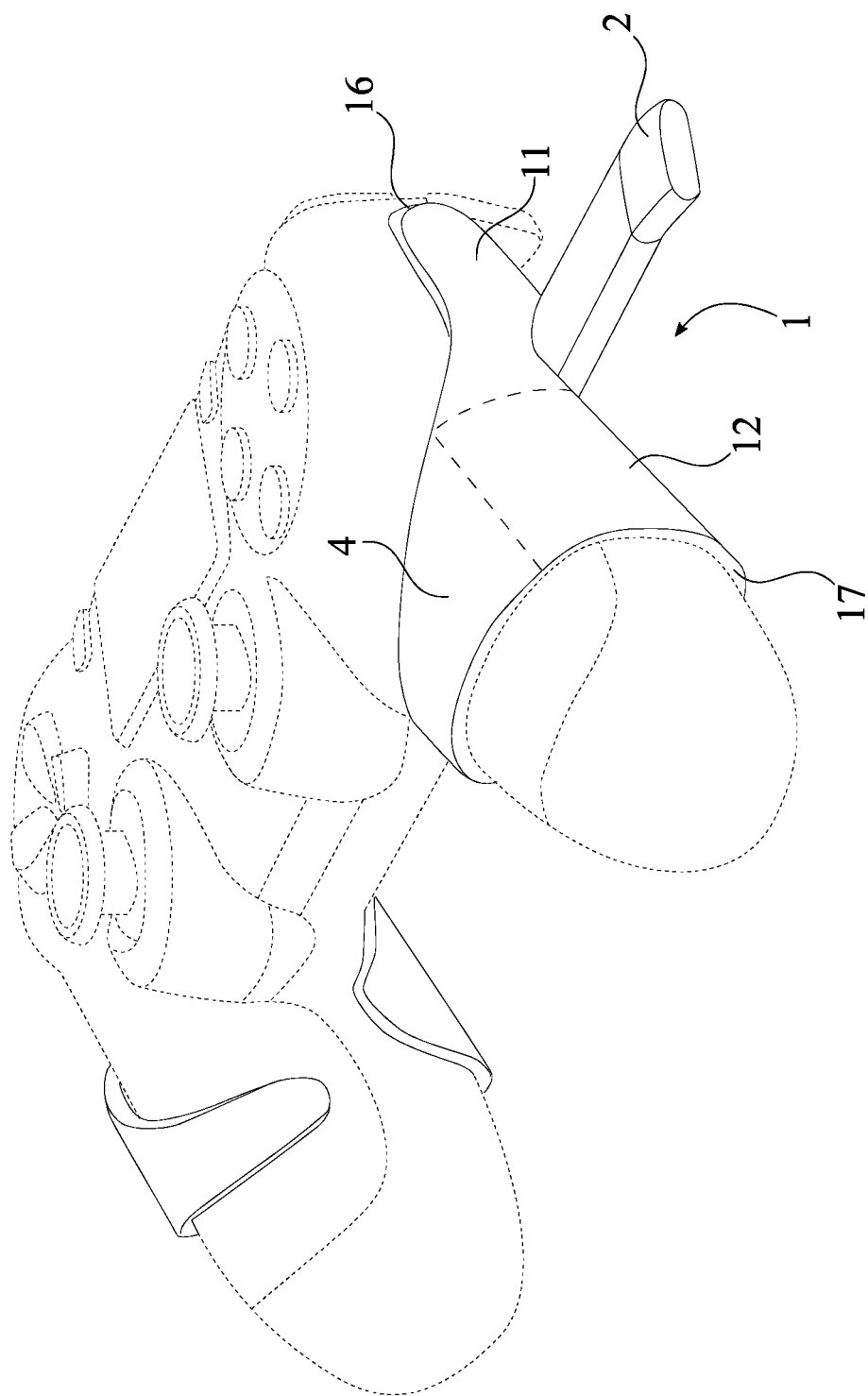
FIG. 1 is a perspective view for one embodiment of the present invention, wherein the present invention comprises a grip restraint and wherein the present invention is mounted onto a videogame controller.
Figure 2:
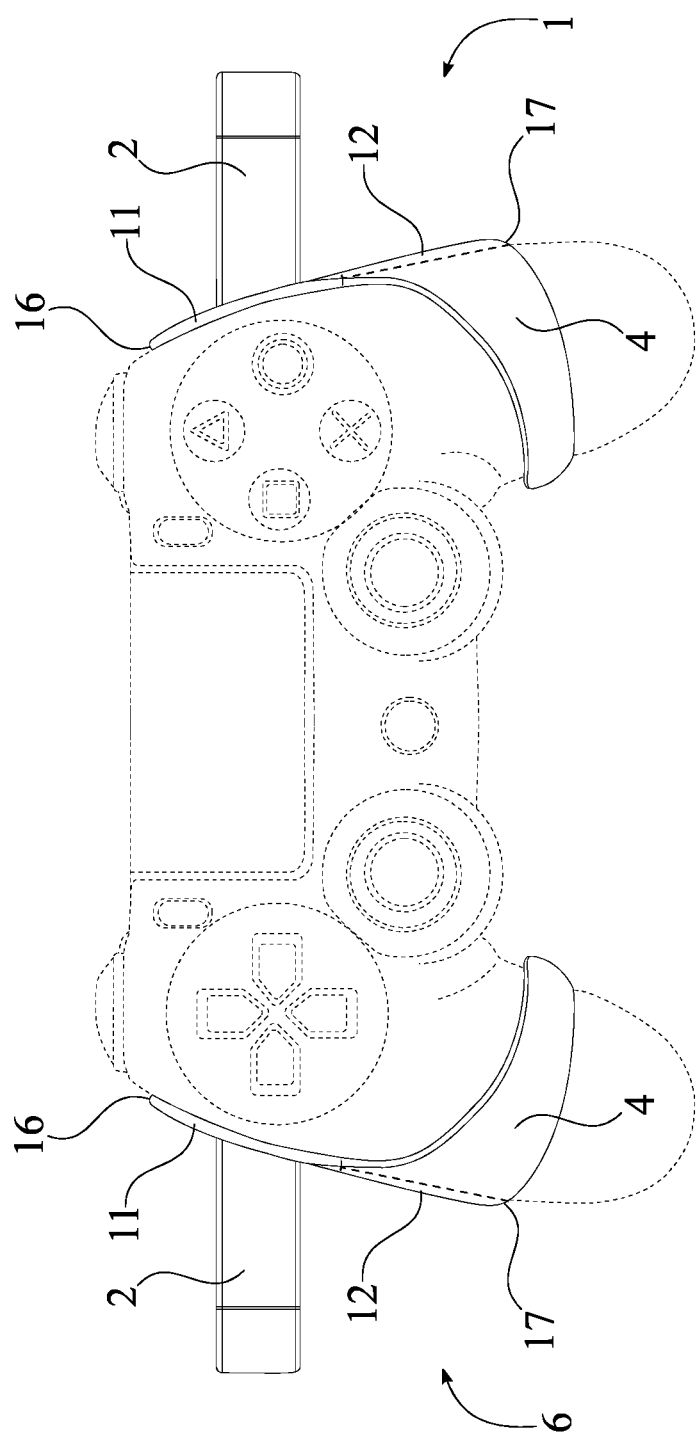
FIG. 2 is a front view for one embodiment of the present invention, wherein the present invention comprises a grip restraint and wherein the present invention is mounted onto a videogame controller.
Figure 3:
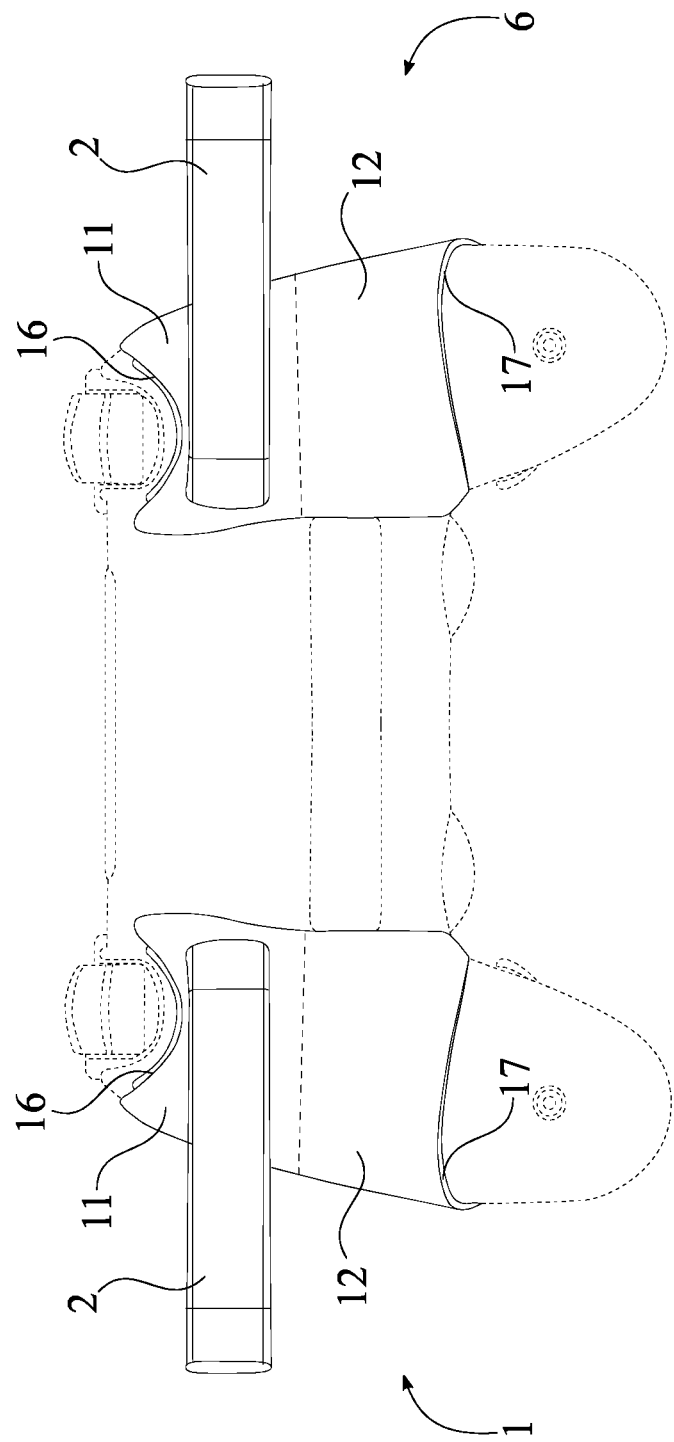
FIG. 3 is a rear view for one embodiment of the present invention, wherein the present invention comprises a grip restraint and wherein the present invention is mounted onto a videogame controller.
Figure 4:
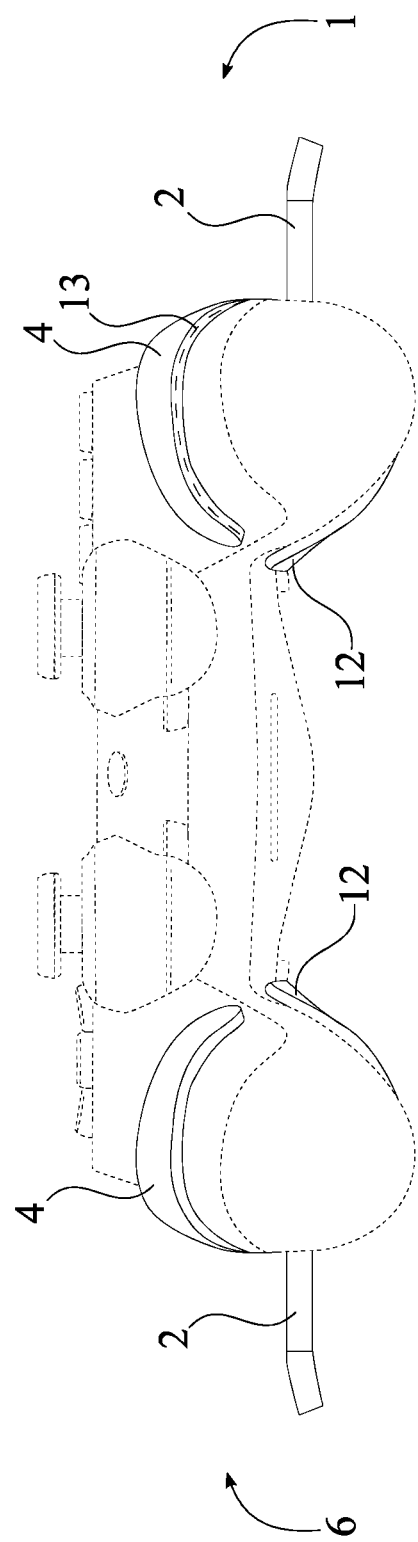
FIG. 4 is a bottom view for one embodiment of the present invention, wherein the present invention comprises a grip restraint and wherein the present invention is mounted onto a videogame controller.
Figure 5:
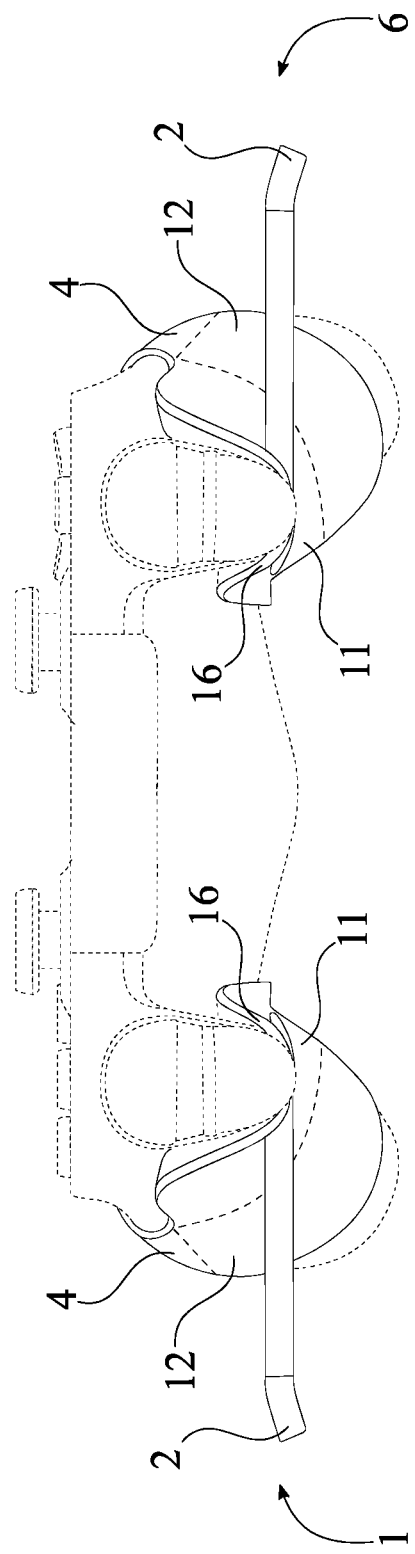
FIG. 5 is a top view for one embodiment of the present invention, wherein the present invention comprises a grip restraint and wherein the present invention is mounted onto a videogame controller.
Figure 6:
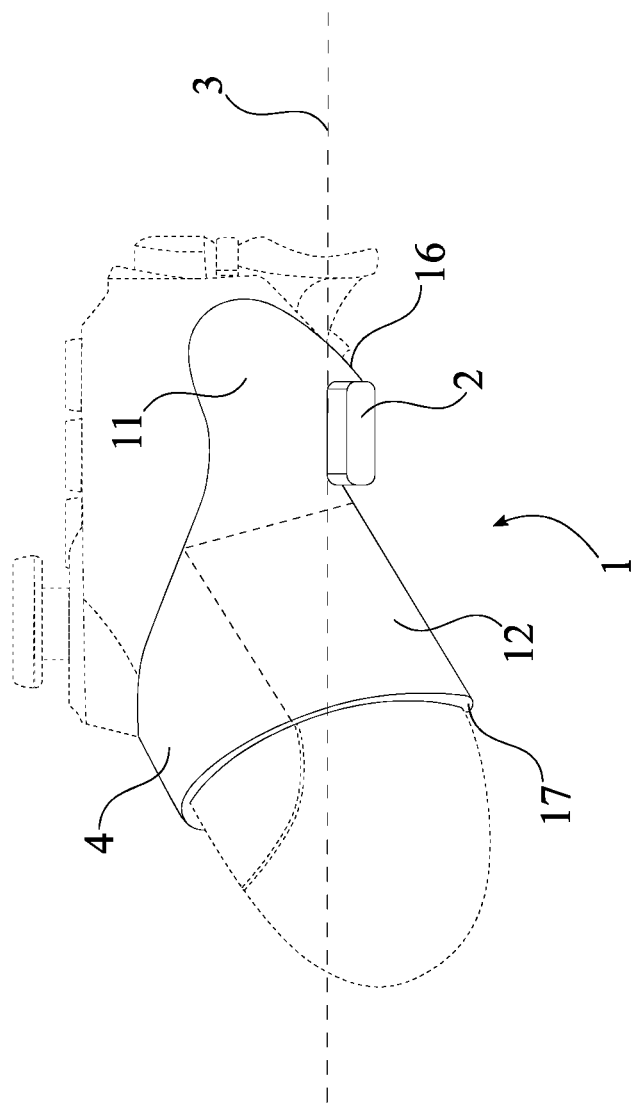
FIG. 6 is a right view for one embodiment of the present invention, wherein the present invention comprises a grip restraint and wherein the present invention is mounted onto a videogame controller.
Figure 7:
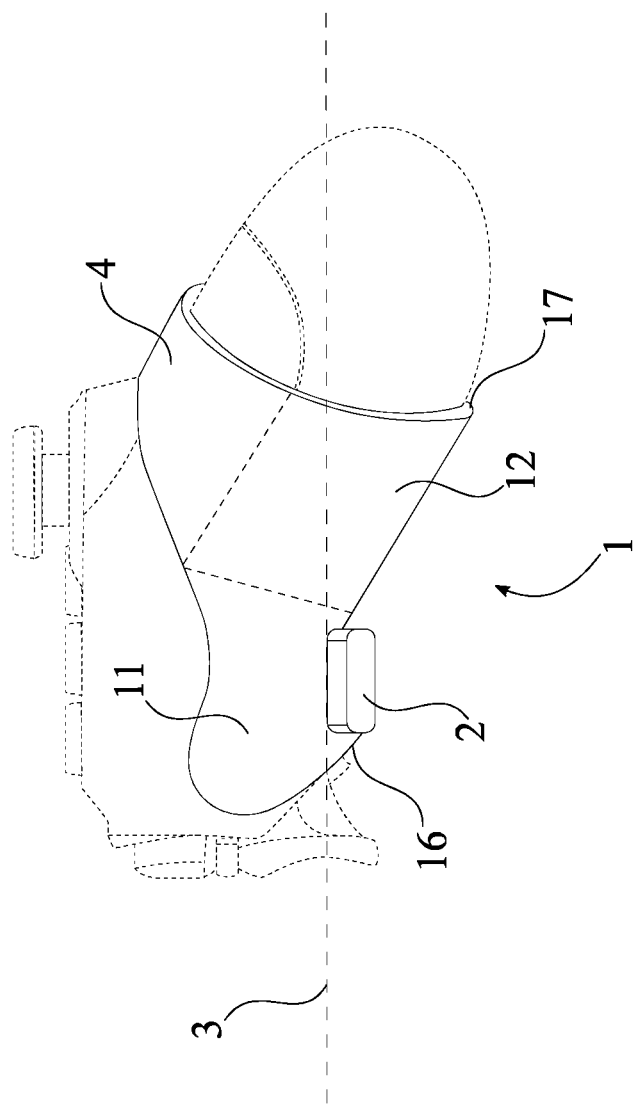
FIG. 7 is a left view for one embodiment of the present invention, wherein the present invention comprises a grip restraint and wherein the present invention is mounted onto a videogame controller.

In accordance to FIG. 1 and FIG. 2, the present invention comprises a first controller grip mount 1, and a first digit support 2. The first controller grip mount 1 is affixed to a rear surface of the videogame controller such that the first controller grip mount 1 supports the videogame controller when the present invention is implemented. The first controller grip mount 1 comprises a first rear controller interface 11 and a first grip interface 12, as shown in FIG. 3. The first rear controller interface 11 is contoured for and positioned against a rear panel of the videogame controller and the first grip interface 12 is contoured for and positioned against a handgrip of the videogame controller in order to support the videogame controller with the present invention. The first rear controller interface 11 comprises a first index digit end 16, detailed in FIG. 3, FIG. 6, and FIG. 7. The first index digit end 16 is a reference for the positioning of other components of the present invent. The first index digit end 16 is generally positioned to the rear panel of the videogame controller where the user would typically have an index finger when gripping the videogame controller. The first grip interface 12 is adjacently connected to the first rear controller interface 11, opposite to the first index digit end 16. The first digit support 2 is positioned between the user's fingers in order to support the present invention and the videogame controller in the user's hand during implementation of the present invention. The first digit support 2 is adjacently connected to the first rear controller interface 11. The first digit support 2 is positioned between the first index digit end 16 and the first grip interface 12. The first digit support 2 extends laterally away from the first rear controller interface 11. The first grip interface 12 comprises a first pinky finger end 17, as shown in FIG. 3 and FIG. 6. The first pinky finger end 17 is positioned to the handgrip of the videogame controller where the user would typically position a pinky finger when gripping the videogame controller. The first pinky finger end 17 is distally positioned from the first rear controller interface 11 in order to support the handgrip of the videogame controller.

In accordance to the preferred embodiment of the present invention, the present invention comprises a coronal plane 3, detailed in FIG. 6, FIG. 7, FIG. 11, and FIG. 15. The coronal plane 3 allows more specific positioning for components in relation to each other. The coronal plane 3 laterally traverses through the first rear controller interface 11. The first pinky finger end 17 is offset from the coronal plane 3 in order to conform to the videogame controller.

For a first alternate embodiment of the present invention, the present invention comprises a grip restraint 4, in accordance to FIG. 1 to FIG. 4, FIG. 6, and FIG. 7. The grip restraint 4 secures the videogame controller within the present invention when the user rotates a front panel of the videogame controller towards the user. The grip restraint 4 is adjacently connected to the first grip interface 12. The grip restraint 4 is adjacently positioned to the first pinky finger end 17 in order to interface with the handgrip. The grip restraint 4 is preferred to have a concave curvature 13 towards the first grip interface 12, detailed in FIG. 4. This configuration allows the handgrip to be received by the present invention, such that the grip restraint 4 and the first grip interface 12 encircle the handgrip to prevent the videogame controller from being dislodged from the present invention.

Some videogame controllers implement two handgrips, one for each hand, for the user to grasp. In addition to the first controller grip mount 1, the present invention comprises a second controller grip mount 6 to evenly support the videogame controller between the user's hands, as shown in FIG. 2 to FIG. 5. The second controller grip mount 6 is similarly configured to the first controller grip mount 1 for the first alternate embodiment of the present invention. The first controller grip mount 1 for a first present invention is affixed to a first handgrip of the videogame controller by inserting the videogame controller between the grip restraint 4 and the first grip interface 12 of the first controller grip mount 1. The first digit support 2 of the first controller grip mount 1 is oriented away from the videogame controller. Similarly, the second controller grip mount 6 is affixed to a second handgrip of the videogame controller by inserting the videogame controller between the grip restraint 4 and the first grip interface 12 of the second controller grip mount 6. The first digit support 2 of the second controller grip mount 6 is oriented away from the videogame controller opposite to the first digit support 2 of the first controller grip mount 1. This configuration allows the user to implement the same grasp on either side of the videogame controller and evenly support the weight of the videogame controller across both hands.

In some embodiments of the present invention, the present invention comprises a first perspiration-venting hole 5, as shown in FIG. 8, FIG. 9, FIG. 13 and FIG. 14. The first perspiration-venting hole 5 allows for air to flow over the user's hands while the user is grasping the present invention. The first perspiration-venting hole 5 centrally traverses through the first controller grip mount 1. The first perspiration-venting hole 5 allows air to flow around the user's hand as the user's hand is offset from the videogame controller by the first controller grip mount 1.

Figure 8:
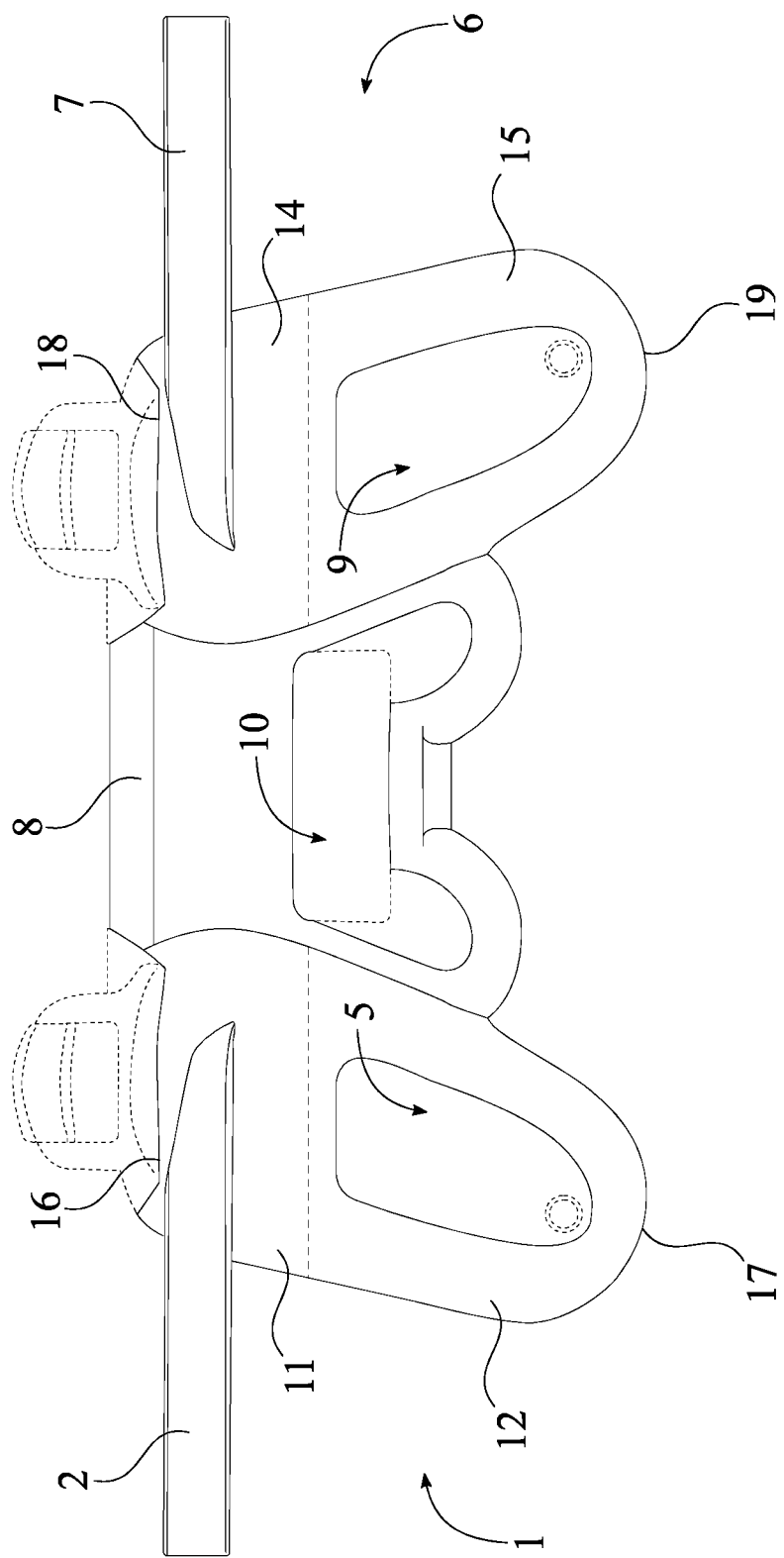
FIG. 8 is a rear view for an alternate embodiment of the present invention, wherein the present invention comprises a grip mount bridge and wherein the present invention is mounted onto a videogame controller.
Figure 9:
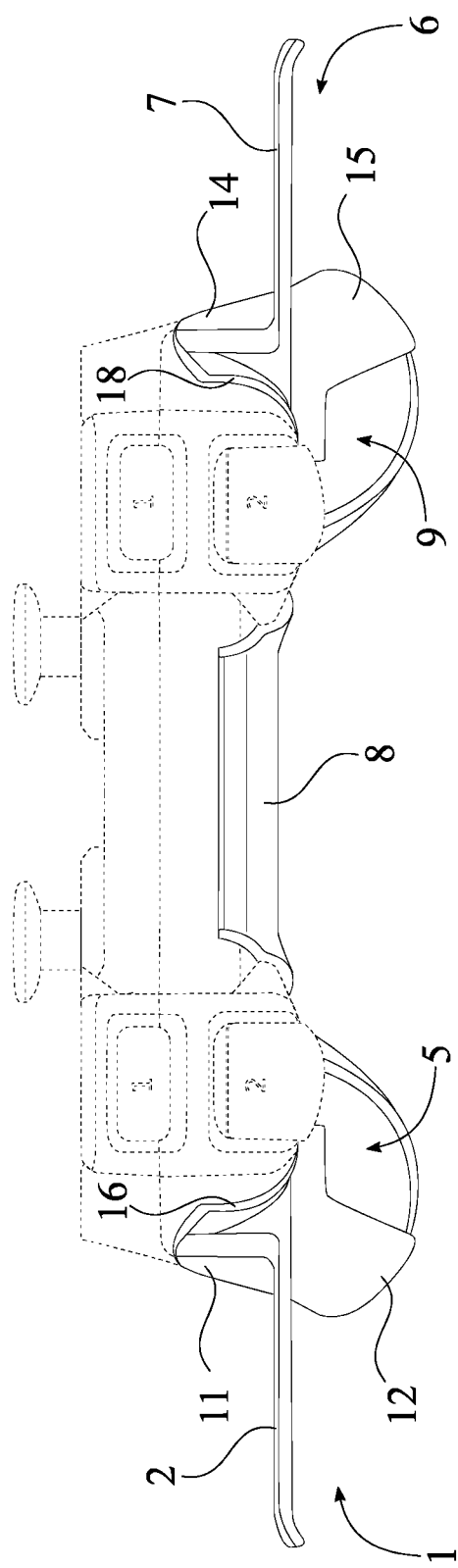
FIG. 9 is a top view for an alternate embodiment of the present invention, wherein the present invention comprises a grip mount bridge and wherein the present invention is mounted onto a videogame controller.
Figure 10:
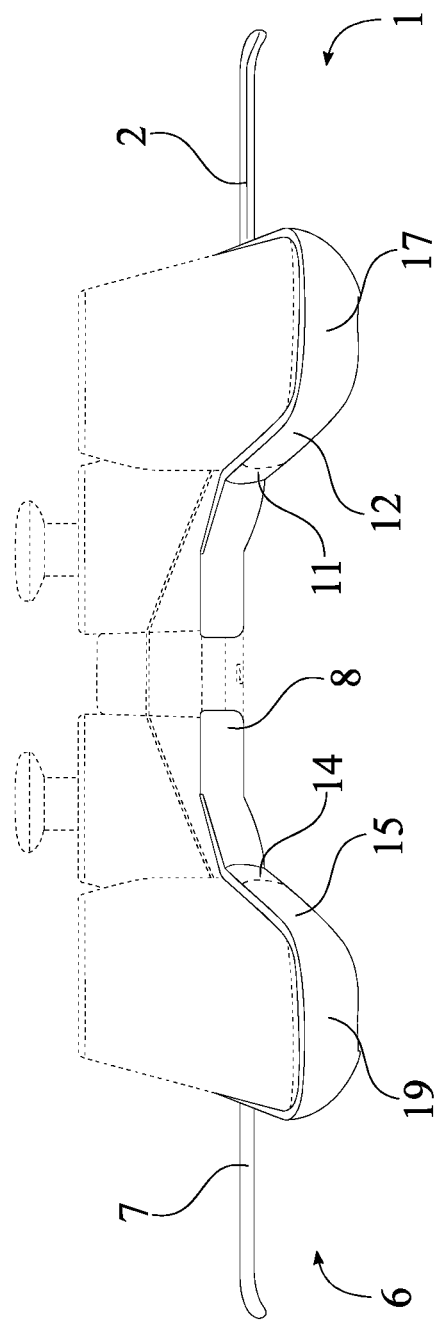
FIG. 10 is a bottom view for an alternate embodiment of the present invention, wherein the present invention comprises a grip mount bridge and wherein the present invention is mounted onto a videogame controller.
Figure 11:
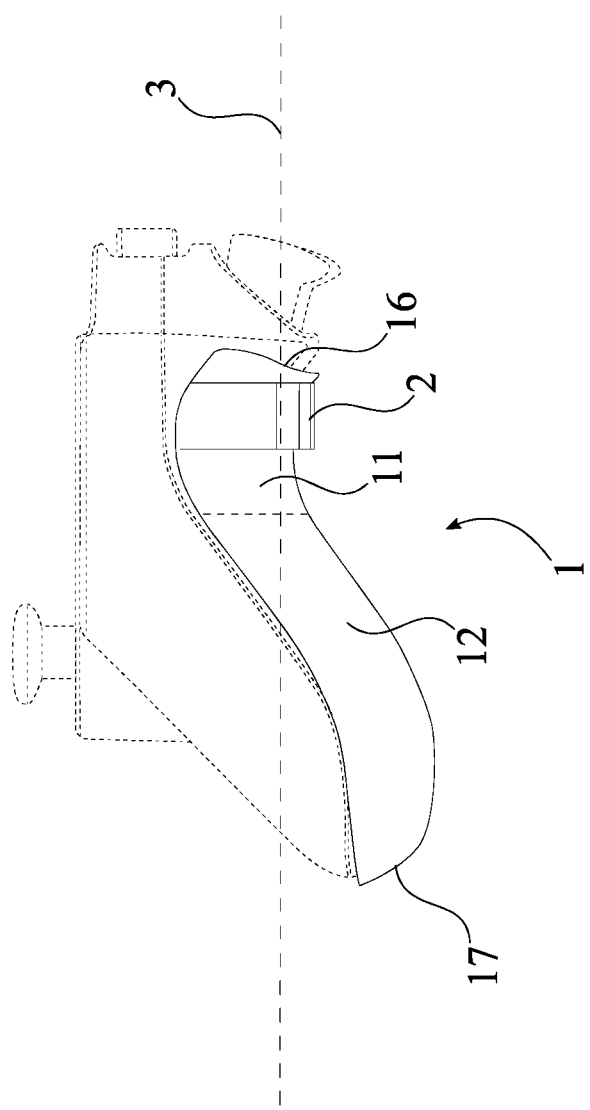
FIG. 11 is a right view for an alternate embodiment of the present invention, wherein the present invention comprises a grip mount bridge and wherein the present invention is mounted onto a videogame controller.
Figure 12:
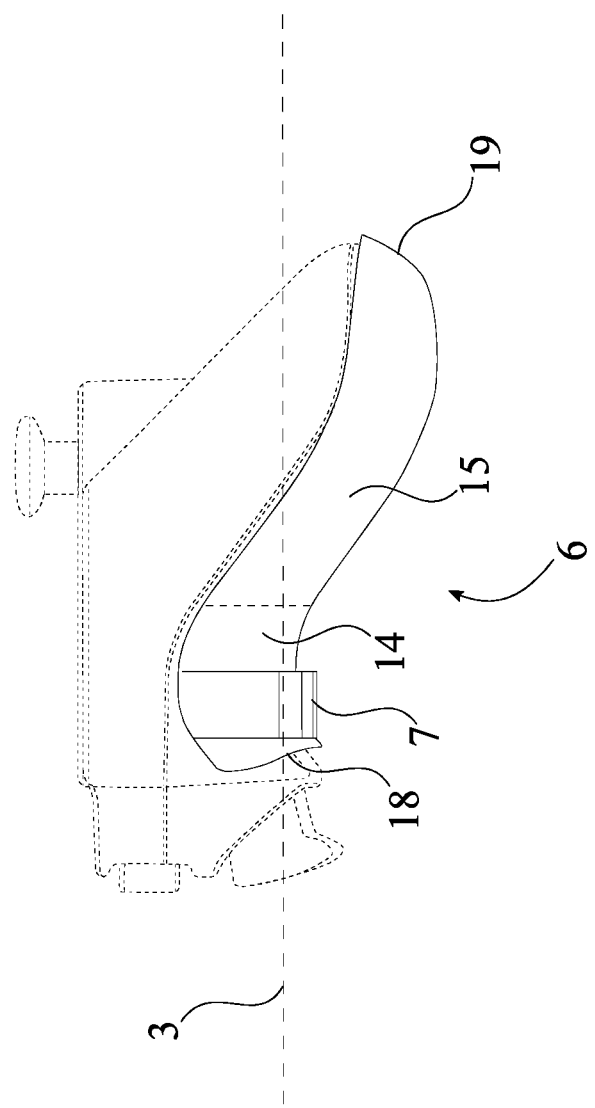
FIG. 12 is a right view for an alternate embodiment of the present invention, wherein the present invention comprises a grip mount bridge and wherein the present invention is mounted onto a videogame controller.

In accordance to a second alternate embodiment of the present invention. the present invention comprises a second controller grip mount 6, a second digit support 7, and a grip-mount bridge 8 to support videogame controllers with two handgrips, as shown in FIG. 8 to FIG. 10. Similar to the first controller grip mount 1, the second controller grip mount 6 is affixed to a rear surface of the videogame controller such that the second controller grip mount 6 supports the videogame controller when the present invention is implemented. Similar to the first digit support 2, the second digit support 7 is positioned between the user's fingers in order to support the present invention and the videogame controller in the user's hand opposite to that of the first digit support 2 during implementation of the present invention. The grip-mount bridge 8 secures the first controller grip mount 1 to the second controller grip mount 6 and additionally distributes the weight of the videogame controller across the present invention. The grip-mount bridge 8 is adjacently connected to the first controller grip mount 1. The grip-mount bridge 8 is adjacently connected to the second controller grip mount 6. The grip-mount bridge 8 is positioned between the first controller grip mount 1 and the second controller grip mount 6 such that the weight of the videogame controller is distributed across the first controller grip mount 1, the second controller grip mount 6, and the grip-mount bridge 8. The second digit support 7 is adjacently connected to the second controller grip mount 6. The first digit support 2 is oppositely oriented to the grip-mount bridge 8. The second digit support 7 is oppositely oriented to the grip-mount bridge 8. Therefore, the first digit support 2 and the second digit support 7 allow the user to grasp each side of the videogame controller and position fingers over the buttons of the videogame controller in an ergonomic manner.

Figure 13:
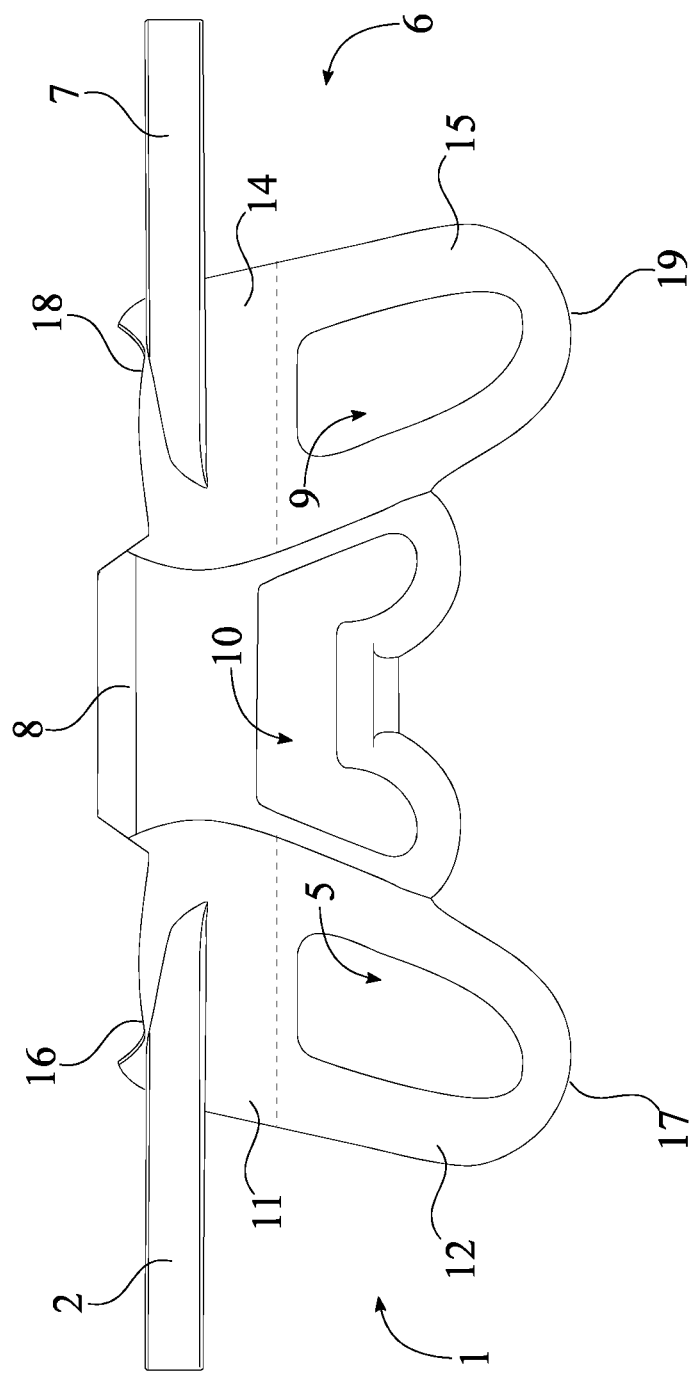
FIG. 13 is a rear view for an alternate embodiment of the present invention, wherein the present invention comprises a grip mount bridge.

More specific to the second alternate embodiment of the present invention, the present invention comprises a bridge ventilation hole 10, in accordance to FIG. 8 and FIG. 13. The bridge ventilation hole 10 allows convective heat transfer to take place on the rear panel of the videogame controller. The bridge ventilation hole 10 traverses through the grip-mount bridge 8 such that air is able to flow through the grip-mount bridge 8. Therefore, the air flow is able to interface with the rear panel of the videogame controller and transfer heat from the battery and other electrical components of the videogame controller to the ambient air.

Figure 14:
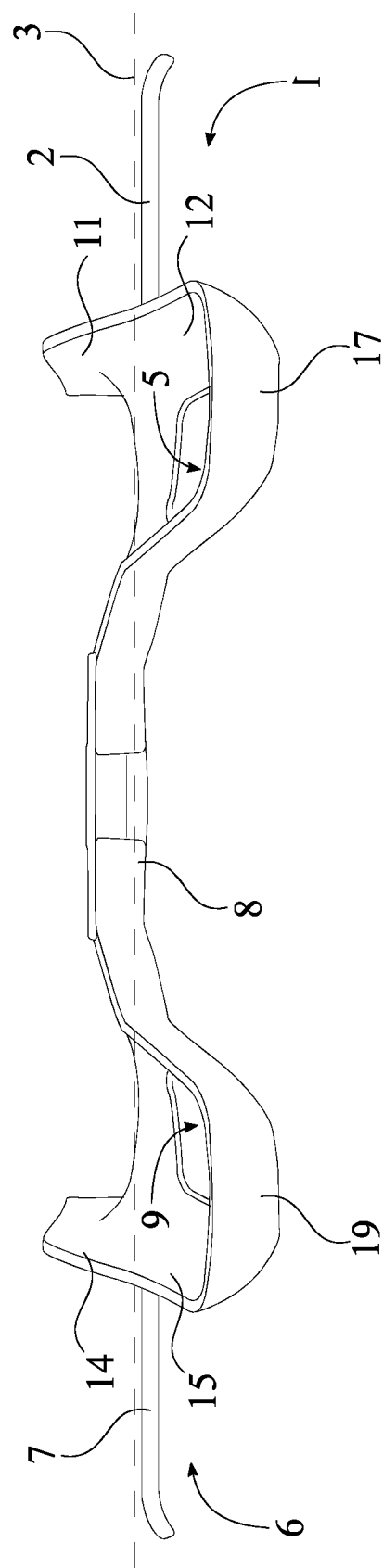
FIG. 14 is a bottom view for an alternate embodiment of the present invention, wherein the present invention comprises a grip mount bridge.
Figure 15:
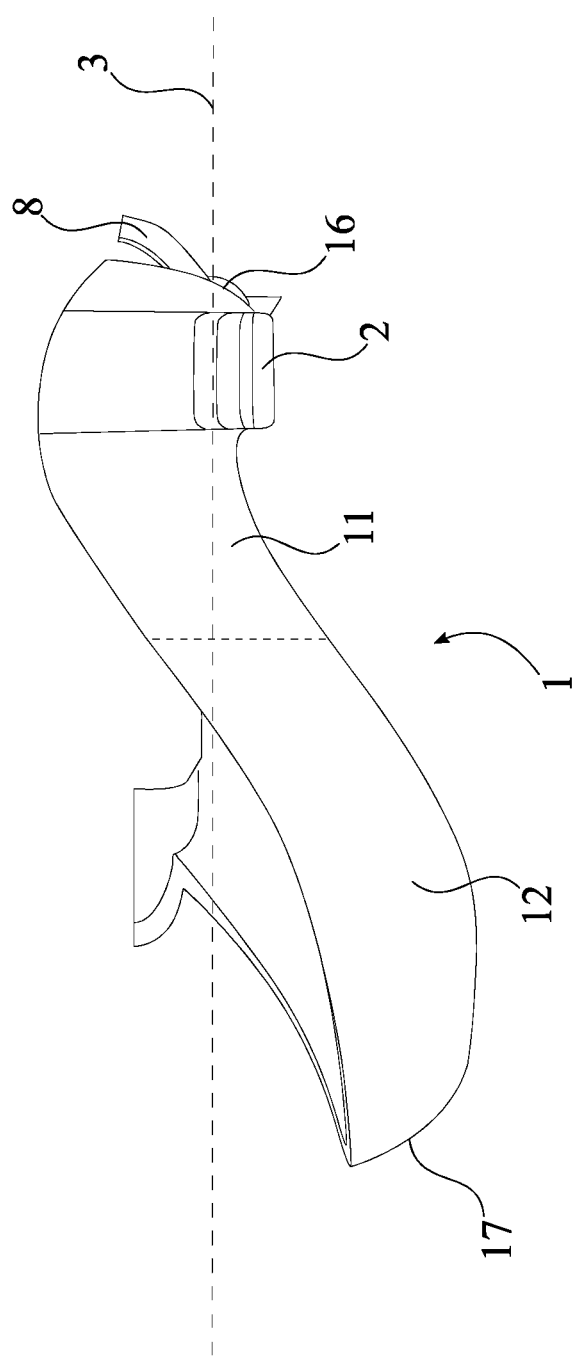
FIG. 15 is a right view for an alternate embodiment of the present invention, wherein the present invention comprises a grip mount bridge.
Figure 16:
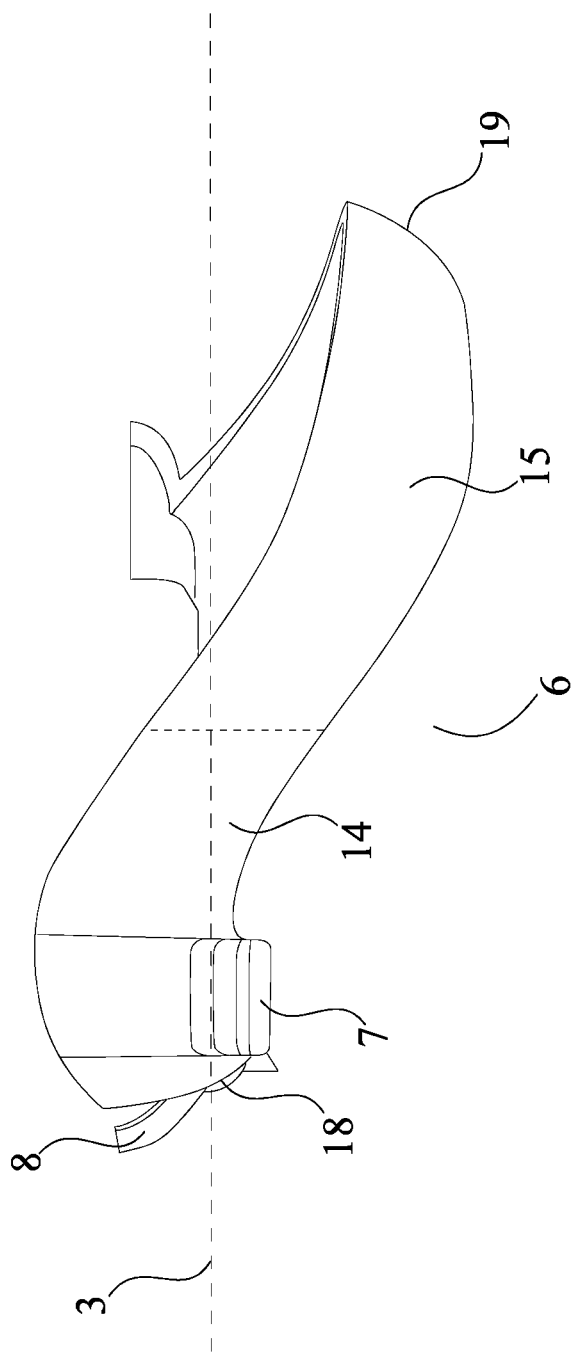
FIG. 16 is a left view for an alternate embodiment of the present invention, wherein the present invention comprises a grip mount bridge.

Further in accordance to the second alternate embodiment of the present invention, the second controller grip mount 6 comprises a second rear controller interface 14 and a second grip interface 15, as shown in FIG. 8 to FIG. 10, FIG. 12 to FIG. 14, and FIG. 16. The second rear controller interface 14 is contoured for and positioned against the rear panel of the videogame controller and the second grip interface 15 is contoured for and positioned against the second handgrip of the videogame controller in order to support the videogame controller with the present invention. The second rear controller interface 14 comprises a second index digit end 18. The second index digit end 18 is a reference for the positioning of other components of the present invent. The second index digit end 18 is positioned to the rear panel of the videogame controller where the user would typically have an index finger for the opposite hand when gripping the videogame controller. The second grip interface 15 is adjacently connected to the second rear controller interface 14, opposite to the second index digit end 18. The second digit support 7 is positioned between user's fingers in order to support the present invention and the videogame controller in the user's hand during implementation of the present invention. The second digit support 7 is adjacently connected to the second rear controller interface 14. The second digit support 7 is positioned between the first index digit end 16 and the second grip interface 15. The second digit support 7 extends laterally away from the second rear controller interface 14. The second grip interface 15 comprises a second pinky finger end 19. The second pinky finger end 19 is positioned to the handgrip of the videogame controller where the user would typically position a pinky finger when gripping the videogame controller. The second pinky finger end 19 is distally positioned from the second rear controller interface 14 in order to support the handgrip of the videogame controller More specifically, the second pinky finger end 19 is offset from the coronal plane 3 in order to conform to the videogame controller as shown in FIG. 14 and FIG. 16.

In some more specific embodiments of the present invention, the present invention comprises a second perspiration-venting hole 9, as shown in FIG. 8, FIG. 9, FIG. 13, and FIG. 14. The second perspiration-venting hole 9 allows for air to flow over the user's hands while the user is grasping the present invention. The second perspiration-venting hole 9 centrally traverses through the second controller grip mount 6. The second perspiration-venting hole 9 allows air to flow around the user's hand as the user's hand is offset from the from the videogame controller by the second controller grip mount 6.

Although the invention has been explained in relation to its preferred embodiment, it is to be understood that many other possible modifications and variations can be made without departing from the spirit and scope of the invention as hereinafter claimed.

What is claimed is:

1. A videogame controller adapter comprises:
a first controller grip mount;
a first digit support;
the first controller grip mount comprises a first rear controller interface and a first grip interface;
the first rear controller interface comprises a first index digit end;
the first grip interface comprises a first pinky finger end;
the first grip interface being adjacently connected to the first rear controller interface, opposite to the first index digit end;
the first digit support being adjacently connected to the first rear controller interface;
the first digit support being positioned between the first index digit end and the first grip interface;
the first digit support extending laterally away from the first rear controller interface;
the first pinky finger end being distally positioned from the first rear controller interface;
a coronal plane;
the coronal plane traverses laterally through the first rear controller interface; and
the first pinky finger end being offset from the coronal plane.

2. The videogame controller adapter, as claimed in claim 1, comprises:
a grip restraint;
the grip restraint being adjacently connected to the first grip interface; and
the grip restraint being adjacently positioned to the first pinky finger end.

3. The videogame controller adapter, as claimed in claim 2, wherein the grip restraint has a concave curvature towards the first grip interface.

4. The videogame controller adapter, as claimed in claim 1, comprises:
a first perspiration-venting hole; and
the first perspiration-venting hole centrally traversing through the first controller grip mount.

5. The videogame controller adapter, as claimed in claim 1, comprises:
a second controller grip mount;
a second digit support;
a grip-mount bridge;
the grip-mount bridge being adjacently connected to the first controller grip mount;
the grip-mount bridge being adjacently connected to the second controller grip mount;
the grip-mount bridge being positioned between the first controller grip mount and the second controller grip mount;
the second digit support being adjacently connected to the second controller grip mount;
the first digit support being oppositely oriented to the grip-mount bridge; and
the second digit support being oppositely oriented to the grip-mount bridge.

6. The videogame controller adapter, as claimed in claim 5, comprises:
the second controller grip mount comprises a second rear controller interface and a second grip interface;
the second rear controller interface comprises a second index digit end;
the second grip interface comprises a second pinky finger end;
the second grip interface being adjacently connected to the second rear controller interface, opposite to the second index digit end;
the second digit support being adjacently connected to the second rear controller interface;
the second digit support being positioned between the second index digit end and the second grip interface;
the second digit support extending laterally away from the second rear controller interface; and
the second pinky finger end being distally positioned from the second rear controller interface.

7. The videogame controller adapter, as claimed in claim 6, comprises:
the coronal plane traverses laterally through the second rear controller interface; and
the second pinky finger end being offset from the second coronal plane.

8. The videogame controller adapter, as claimed in claim 5, comprises:
   a second perspiration-venting hole; and
   the second perspiration-venting hole centrally traversing through the second controller grip mount.

9. The videogame controller adapter, as claimed in claim 5, comprises:
   a bridge ventilation hole; and
   the bridge ventilation hole traversing through the grip-mount bridge.

* * * * *